United States Patent
Chen et al.

(10) Patent No.: US 11,158,910 B2
(45) Date of Patent: Oct. 26, 2021

(54) BATTERY BUSBAR

(71) Applicant: INDUSTRIAL TECHNOLOGY RESEARCH INSTITUTE, Hsinchu (TW)

(72) Inventors: Chih-Ting Chen, New Taipei (TW); Chein-Chung Sun, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 106 days.

(21) Appl. No.: 16/162,688

(22) Filed: Oct. 17, 2018

(65) Prior Publication Data

US 2019/0173072 A1 Jun. 6, 2019

(30) Foreign Application Priority Data

Dec. 5, 2017 (TW) ................ 106218078

(51) Int. Cl.
*H01M 2/20* (2006.01)
*H01M 2/10* (2006.01)
(Continued)

(52) U.S. Cl.
CPC ......... *H01M 50/502* (2021.01); *H01M 50/20* (2021.01); *H01M 50/528* (2021.01);
(Continued)

(58) Field of Classification Search
CPC ...... H01M 2/206; H01M 2/1077; H01M 2/22; H01M 50/20; H01M 50/502; H01M 50/528; H01M 50/543; H01M 10/0525
See application file for complete search history.

(56) References Cited

U.S. PATENT DOCUMENTS

| 7,471,066 B2 | 12/2008 | Ambrosio et al. |
| 2014/0255750 A1 | 9/2014 | Jan et al. |
| 2016/0181579 A1* | 6/2016 | Geshi .................. H01M 50/581 |
| | | 429/61 |

FOREIGN PATENT DOCUMENTS

| CN | 102097844 A | 6/2011 |
| CN | 102473892 A | 5/2012 |

(Continued)

OTHER PUBLICATIONS

Korea Patent Office, "Office Action", dated Feb. 13, 2020.
(Continued)

*Primary Examiner* — Osei K Amponsah
(74) *Attorney, Agent, or Firm* — Locke Lord LLP; Tim Tingkang Xia, Esq.

(57) ABSTRACT

The disclosure provides a battery busbar including a conductive sheet, at least two bridge portions and at least two terminal contact portions. The conductive sheet has at least one cavity portion. Each of the at least two bridge portions has a first end and a second end which are opposite to each other, and the first ends of the bridge portions are respectively connected to different sides of the at least one cavity portion. The terminal contact portions are spaced apart from each other and are respectively connected to the second ends of the bridge portions. A width direction is defined to be substantially perpendicular to a line passing through the first end and the second end of one of the at least two bridge portions; along the width direction, a width of the bridge portion is smaller than a width of the terminal contact portion.

14 Claims, 9 Drawing Sheets

(51) Int. Cl.
*H01M 2/22* (2006.01)
*H01M 50/502* (2021.01)
*H01R 31/08* (2006.01)
*H02J 7/00* (2006.01)
*H01M 50/20* (2021.01)
*H01M 50/528* (2021.01)
*H01M 50/543* (2021.01)
*H01M 10/0525* (2010.01)
*H01R 12/59* (2011.01)
*H01R 4/34* (2006.01)

(52) U.S. Cl.
CPC .......... *H01M 50/543* (2021.01); *H01R 31/08* (2013.01); *H02J 7/0014* (2013.01); *H01M 10/0525* (2013.01); *H01M 2220/20* (2013.01); *H01R 4/34* (2013.01); *H01R 12/592* (2013.01)

(56) References Cited

FOREIGN PATENT DOCUMENTS

| | | | |
|---|---|---|---|
| CN | 203617379 U | 5/2014 | |
| CN | 104716289 A | 6/2015 | |
| CN | 205211838 U | 5/2016 | |
| CN | 205863278 U | 1/2017 | |
| CN | 205882046 U | 1/2017 | |
| CN | 206022497 U | 3/2017 | |
| CN | 206022500 U | 3/2017 | |
| CN | 206040792 U | 3/2017 | |
| CN | 206059497 U | 3/2017 | |
| JP | 2017076491 A | 4/2017 | |
| JP | 2017-076491 * | 4/2020 | .............. H01M 2/10 |
| TW | I318017 B | 12/2009 | |
| TW | I488352 B | 6/2015 | |
| TW | I496381 B | 8/2015 | |
| WO | 2015064097 A1 | 5/2015 | |

OTHER PUBLICATIONS

C. P. Yang et al., Simulation methodologies to support novel fuse design for energy storage systems using COMSOL, IET Hybrid and Electric Vehicles Conference, 2013.

* cited by examiner

BATTERY BUSBAR

CROSS-REFERENCE TO RELATED APPLICATIONS

This non-provisional application claims priority under 35 U.S.C. § 119(a) on Patent Application No(s). 106218078 filed in Taiwan on Dec. 5, 2017, the entire contents of which are hereby incorporated by reference.

TECHNICAL FIELD

The disclosure relates to a battery busbar.

BACKGROUND

In recent years, crude oil reserves have been decreasing, and the problem of relying on fossil fuels exacerbates global warming, thus the environmental awareness has been growing. Electrical energy replacing fossil fuels becomes the trend of the ongoing energy revolution. As a result, the demand for secondary battery (also called rechargeable battery) is largely growing every year. A rechargeable lithium battery is light in weight and has a high power density and a long service life, so it is widely used in various types of vehicles, such as bicycles, motorbikes or cars. According to the desired operating voltage and electric capacity required by various applications, it requires a large amount of lithium batteries to be serially/parallel connected in a specific manner.

SUMMARY

One embodiment of the disclosure provides a battery busbar including a conductive sheet, at least two bridge portions and at least two terminal contact portions. The conductive sheet has at least one cavity portion. Each of the at least two bridge portions has a first end and a second end which are opposite to each other, and the first ends of the at least two bridge portions are respectively connected to different sides of the at least one cavity portion. The at least two terminal contact portions are spaced apart from each other and are respectively connected to the second ends of the at least two bridge portions. A width direction is defined to be substantially perpendicular to a line passing through the first end and the second end of one of the at least two bridge portions; along the width direction, a width of the bridge portion is smaller than a width of the terminal contact portion.

According to the battery busbar as discussed in above, the bridge portions which are connected between the terminal contact portions and the conductive sheet can act as a vibration buffer to absorb vibration caused by an external force, thereby ensuring the electrical connection between the battery busbar and the battery terminals and increasing the reliability of the battery busbar.

In addition, the bridge portions, which are connected to different sides of the cavity portion, thus an electric current path on the battery busbar between the terminal contact portions is increased. This increases the resistance on the battery busbar between the soldering points. As a result, during the spot soldering process, the electric current tends to flow into the battery terminal from one of the terminal contact portions and then flow back to the other terminal contact portion to finish the desired loop of the electric current instead of directly flowing to the other terminal contact portion, thus the electric current is ensured to flow through the soldering points and the battery terminals, thereby ensuring and improving the soldering quality and reducing the number of times the soldering process is performed.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

Figure 1:
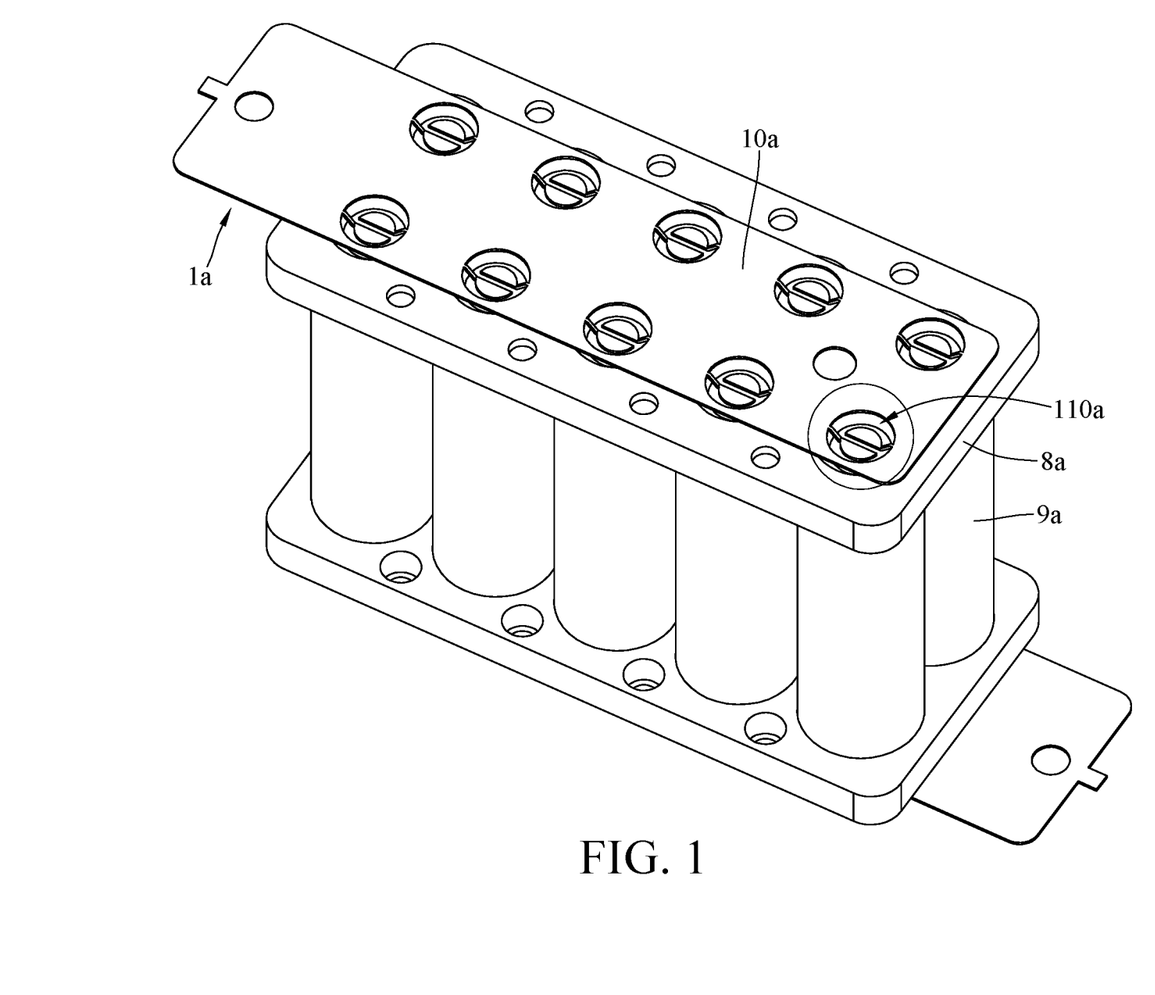
FIG. 1 is a perspective view of a battery busbar according to a first embodiment of the present disclosure being disposed on batteries.
Figure 2:
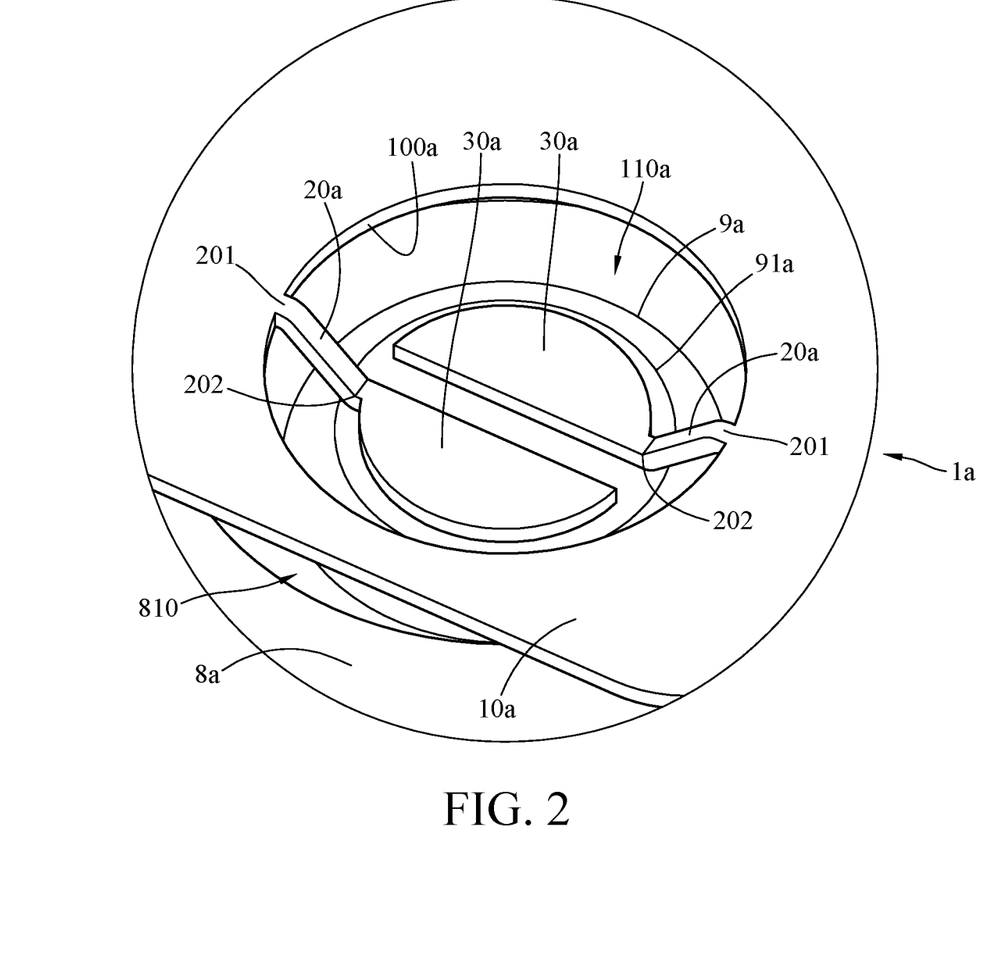
FIG. 2 is a partial enlarged perspective view of FIG. 1.

Firstly, please refer to FIGS. 1-2, FIG. 1 is a perspective view of a battery busbar according to a first embodiment of the present disclosure being disposed on batteries, and FIG. 2 is a partial enlarged perspective view of FIG. 1. This embodiment provides a battery busbar 1a that can be soldered on a plurality of batteries 9a. The battery busbar 1a is made of a material that has high electrical conductivity and is flexible, such as nickel. Such material is adaptive to be soldered on a terminal of a secondary battery (also called secondary cell or rechargeable battery). In one embodiment, this material may be additionally provided with an anticorrosion coating or underwent a certain process to increase corrosion resistance. And the battery 9a is, for example, an 18650 lithium-ion battery. As shown in FIGS. 1-2, there are two covers 8a respectively covering at front and rear sides of the batteries 9a, the battery busbar 1a is disposed on a side of one of the covers 8a away from the batteries 9a, and the batter busbar 1a is electrically connected to terminals (also called battery terminal) 91a of the batteries 9a via through holes 810 of the cover 8a. In addition, the covers 8a can position the batteries 9a and can properly separate the parts of the batteries 9a and the battery busbar 1a that are not supposed to be in contact with each other.

Then, the battery busbar 1a is described in more detail in the following paragraphs.

Figure 3:
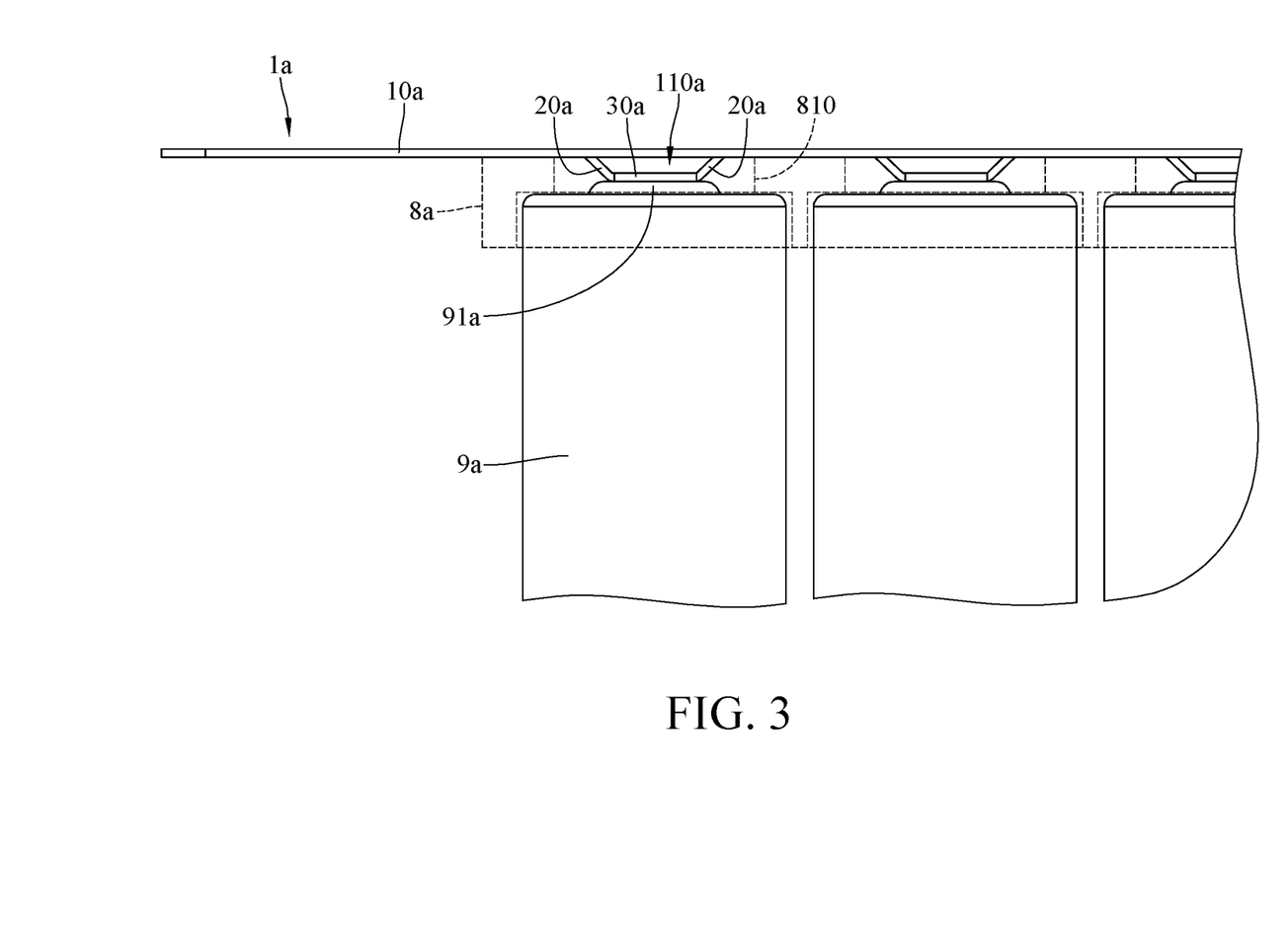
FIG. 3 is a partial enlarged side view of FIG. 1.
Figure 4:
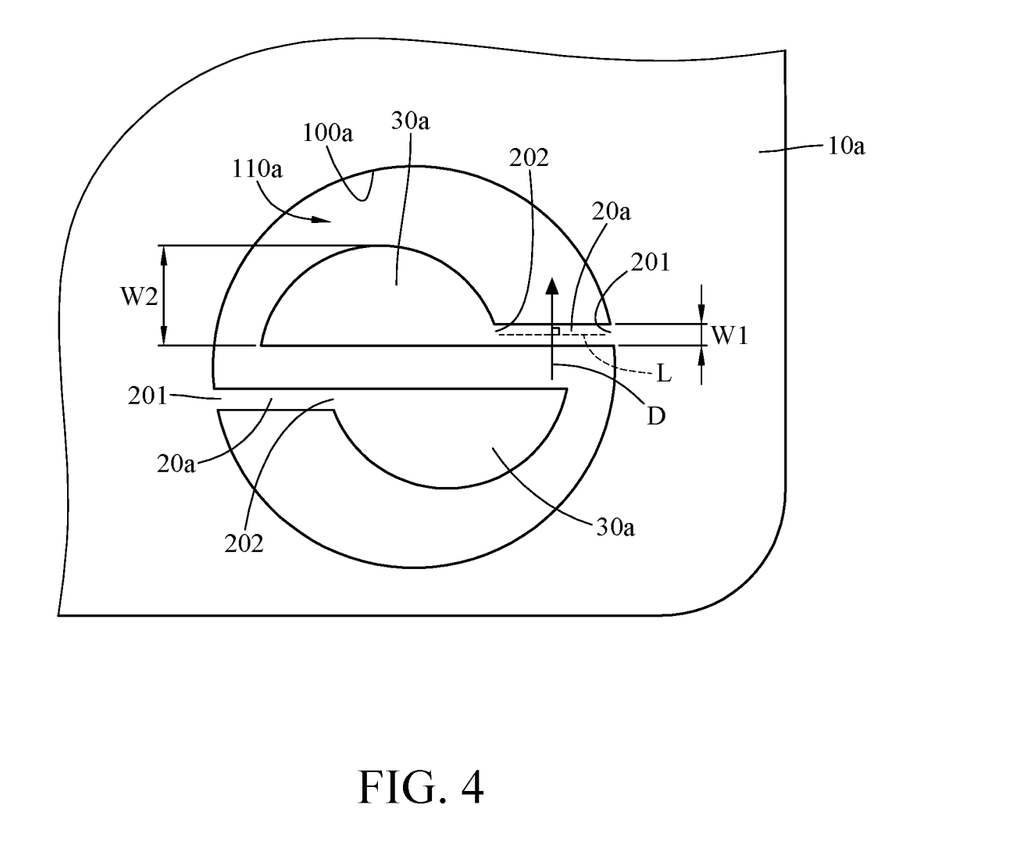
FIG. 4 is a partial enlarged planar view of the battery busbar in FIG. 1 before being bent.

Please refer to FIG. 2 and further refer to FIGS. 3-4, FIG. 3 is a partial enlarged side view of FIG. 1, and FIG. 4 is a partial enlarged planar view of the battery busbar in FIG. 1 before being bent. It is noted that the cover 8a in FIG. 3 is illustrated in dotted-line for the purpose of simplicity, and the battery busbar 1a in FIG. 4 is illustrated in a state not yet being bent for the purpose of easy description of the configuration of the battery busbar 1a.

In this embodiment, the battery busbar 1a is made of one piece, and includes a conductive sheet 10a, a plurality of bridge portions 20a and a plurality of terminal contact portions 30a.

The conductive sheet 10a has a plurality of cavity portions 110a. Each of the cavity portions 110a is formed by an inner edge 100a. The plurality of cavity portions 110a correspond the through holes 810 of the cover 8a and the terminals 91a of the batteries 9a.

The terminal contact portions 30a are used to be in electric contact with the terminals 91a and also are the portion that are used to be soldered on the terminals 91a by a soldering process such as a spot soldering or an ultrasonic soldering.

As shown in FIG. 2, there are two bridge portions 20a and two terminal contact portions 30a at each cavity portion 110a, and the bridge portions 20a are bendable with respect to the conductive sheet 10a. In more detail, each bridge portion 20a has a first end 201 and a second end 202 opposite to each other. At each cavity portion 110a, the first ends 201 of the bridge portions 20a are respectively directly connected to different sides of the inner edge 100a forming the cavity portion 110a. In this embodiment, the first ends 201 of the bridge portions 20a are respectively connected to two opposite sides of the cavity portion 110a, but the present disclosure is not limited thereto. For example, in some other embodiments, the first ends of the bridge portions at each cavity portion may be located at another two locations, and extension directions of the two bridge portions may intersect each other. The terminal contact portions 30a are respectively connected to the second ends 202 of the bridge portions 20a; that is, the bridge portion 20a is located between and connected to the conductive sheet 10a and one of the terminal contact portions 30a.

By this configuration, the bridge portion 20a can be bent downward so as to lower the location of the terminal contact portion 30a, enabling the terminal contact portion 30a to electrically contact the terminal 91a of one of the batteries 9a. As shown in FIG. 3, by bending downward the bridge portions 20a, the conductive sheet 10a and the terminal contact portions 30a can be located on different horizontal planes (i.e., the conductive sheet 10a and the terminal contact portions 30a are non-coplanar) and spaced apart by a certain distance, which helps to avoid the problem that the conductive sheet is flatly placed on the terminals.

Importantly, the bridge portion 20a can act as a vibration buffer to absorb vibration caused by an external force in order to reduce vibration on the terminal contact portion 30a, thereby ensuring the electrical connection between the battery busbar 1a and the terminals 91a of the batteries 9a. Therefore, when an external force is applied on the whole system to cause it to vibrate, the batteries 9a and the battery busbar 1a may have a relative displacement, at this moment, the bridge portions 20a can allow the conductive sheet 10a to move with the terminals 91a so as to reduce the vibration on the terminal contact portion 30a, thereby preventing the soldering connections between the terminal contact portions 30a and the terminals 91a from breaking.

In addition, the terminal contact portion 30a and the bridge portion 20a are different in shape. For example, in this embodiment, the bridge portion 20a is in an elongated shape, and each terminal contact portions 30a is in a semicircle shape, or a fan shape having a central angle of 180 degrees. Thus, at each cavity portion 110a, the two terminal contact portions 30a can together form a circle-like shape which matches the shape of the terminal 91a of the battery 9a. This helps to align the terminal contact portions 30a with the terminals 91a during the spot soldering process. The "match" means that shape formed by the two terminal contact portions 30a is similar to the shape of the terminal 91a. However, the shape of each terminal contact portion may be changed according to the shape of the terminal. For example, in some other embodiments, each pair of terminal contact portions may form a square matching a square-shaped terminal.

Furthermore, worthy to mention is that the locations of the bridge portions 20a can increase the electric current path on the conductive sheet 10a.

In detail, the bridge portions 20a are respectively connected to opposite sides of the cavity portion 110a, thus an electric current path on the conductive sheet 10a between the terminal contact portions 30a is relatively long (the said electric current path at least contains the length of the edge of the cavity portion 110a from one bridge portion 20a to the other). Therefore, the resistance on the conductive sheet 10a between the two soldering points is increased. In such a case, during the spot soldering process, the electric current tends to flow into the terminal 91a from one of the terminal contact portions 30a and then flow to the other terminal contact portion 30a to finish the desired loop of the electric current instead of directly flowing toward the other terminal contact portion 30a, thereby ensuring and improving the soldering quality. In addition, it is understood that the bridge portions 20a which are oppositely disposed can maximum the electric current path (i.e., the resistance) on the conductive sheet 10a between the terminal contact portions 30a at each cavity portion 110a.

Then, as shown in FIG. 4, a width direction D is defined to be substantially perpendicular to a line L passing through the first end 201 and the second end 202 of the bridge portion 20a. Along the width direction D, a width W1 of the bridge portion 20a is smaller than a width W2 of the terminal contact portion 30a.

More specifically, adjusting the specification of the bridge portion 20a (e.g., width, length and/or thickness, etc.) can increase the resistance of the bridge portion 20a. In this and other embodiments, with the increase of the resistance of the bridge portion 20a, the bridge portion 20a can be taken as a fuse, such that the bridge portion 20a will melt if the electric current is too high. Please refer to the following Table 1 and Table 2 in below.

Table 1 shows an example of the specification of the bridge portion of this embodiment.

TABLE 1

| material: Ni200 (pure nickel) |
| electrical resistivity $\rho(\Omega m)$ = 9E−08 |
| melting point(° C.) = 1455 |
| specific heat capacity(J/g*K) = 0.452 |
| density (g/cm3) = 8.9 |

| | |
|---|---|
| length L (mm) | 2.5 |
| width W (mm) | 0.3 |
| Thickness (mm) | 0.3 |

TABLE 1-continued material: Ni200 (pure nickel)
electrical resistivity ρ(Ωm) = 9E−08
melting point(° C.) = 1455
specific heat capacity(J/g*K) = 0.452
density (g/cm3) = 8.9

| sectional area (m2) | 0.00000009 |
| surface area (m2) | 0.0000015 |
| volume (m3) | 2.25E−10 |
| mass (g) | 0.0020025 |
| resistance R(Ω) | 0.025 |
| quantity | 2 |
| overall resistance R(Ω) | 0.005 |
| electric current (A) | 20 |
| electric power (W) | 2 |

Table 2 shows the results of spot soldering the bridge portion in Table 1 under various conditions.

TABLE 2

| Time(s) | do not consider heat dissipation/ quantity of heat on nickel sheet(J) | do not consider heat dissipation/ temperature rise of nickel sheet(° C.) | quantity of convection heat dissipation heat of surface of nickel sheet(J) | consider convection heat dissipation/ quantity of heat on nickel sheet(J) | consider convection heat dissipation/ temperature rise of nickel sheet(° C.) |
| --- | --- | --- | --- | --- | --- |
| 0.01 | 0.02 | 22.09627 | 9.94332E−06 | 0.019990057 | 22.08529 |
| 0.05 | 0.1 | 110.4814 | 0.000248583 | 0.099751417 | 110.2067 |
| 0.1 | 0.2 | 220.9627 | 0.000994332 | 0.199005668 | 219.8642 |
| 0.15 | 0.3 | 331.4441 | 0.002237248 | 0.297762752 | 328.9724 |
| 0.2 | 0.4 | 441.9255 | 0.003977329 | 0.396022671 | 437.5313 |
| 0.25 | 0.5 | 552.4068 | 0.006214577 | 0.493785423 | 545.5409 |
| 0.3 | 0.6 | 662.8882 | 0.008948991 | 0.591051009 | 653.0012 |
| 0.35 | 0.7 | 773.3696 | 0.012180571 | 0.687819429 | 759.9123 |
| 0.4 | 0.8 | 883.8509 | 0.015909317 | 0.784090683 | 866.2741 |
| 0.45 | 0.9 | 994.3323 | 0.020135229 | 0.879864771 | 972.0866 |
| 0.5 | 1 | 1104.814 | 0.024858308 | 0.975141692 | 1077.35 |
| 0.55 | 1.1 | 1215.295 | 0.030078552 | 1.069921448 | 1182.064 |
| 0.6 | 1.2 | 1325.776 | 0.035795963 | 1.164204037 | 1286.229 |
| 0.65 | 1.3 | 1436.258 | 0.04201054 | 1.25798946 | 1389.844 |
| 0.7 | 1.4 | 1546.739 | 0.048722283 | 1.351277717 | 1492.91 |

As shown in Table 1 and Table 2, the bridge portions 20a are made according to the specification recited in Table 1; that is, each bridge portion 20a has a length of 2.5 mm, a width of 0.3 mm, and a thickness of 0.3 mm, such that each bridge portion 20a has a large resistance. In such a case, if an electric current of 20 A flows through the bridge portion 20a, the bridge portion 20a would only take approximately 0.7 second to reach its melting temperature and break. It can be seen that, due to the high resistance of the bridge portion 20a, a sudden high current can cause a large amount of heat buildup on the bridge portion 20a and abruptly raise the temperature of the bridge portion 20a to melt the bridge portion 20a. Therefore, it can be understood that adjusting the size of the bridge portion 20a (e.g., width, length and/or thickness) can help the bridge portion 20a itself to become a fuse in cases of short-circuit accidents or others, thereby expanding the range of application and increasing the safety. However, it is noted that the bridge portion 20a is in an acceptable range of temperature at rated current.

Accordingly, in one embodiment, the battery busbar 1a has the following advantages:

(a) keep using the lower-cost spot soldering apparatus to perform the spot soldering process;

(b) the terminal contact portions with the oppositely disposed bridge portions help the electric current to flow through the soldering points and the terminal, ensuring the soldering quality and reducing the number of times when the soldering process is performed;

(c) the conductive sheet is made from cutting and then bending a metal sheet, thus the manufacturing cost is low and the product has a wide application potential;

(d) the shape formed by the terminal contact portions matches the battery terminal, which helps to align the terminal contact portions with the battery terminals so as to increase the manufacturing efficiency;

(e) the bridge portion can act as a vibration buffer to absorb vibration caused by an external force, thereby ensuring the electrical connection between the battery busbar and the battery terminals and increasing the reliability of the battery busbar;

(f) the bridge portion, which is made in a specific size, can be taken as a fuse in cases of short-circuit accidents or others, thereby expanding the range of application and increasing the safety.

Figure 5:
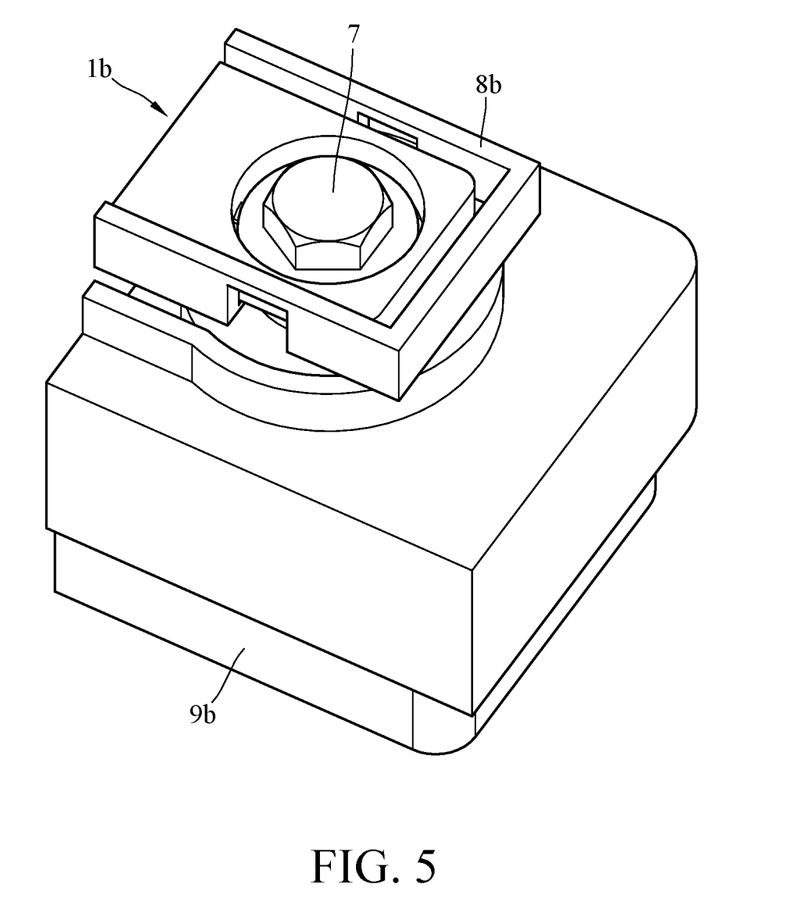
FIG. 5 is a partial enlarged perspective view of a battery busbar according to another embodiment of the present disclosure being disposed on a battery.
Figure 6:
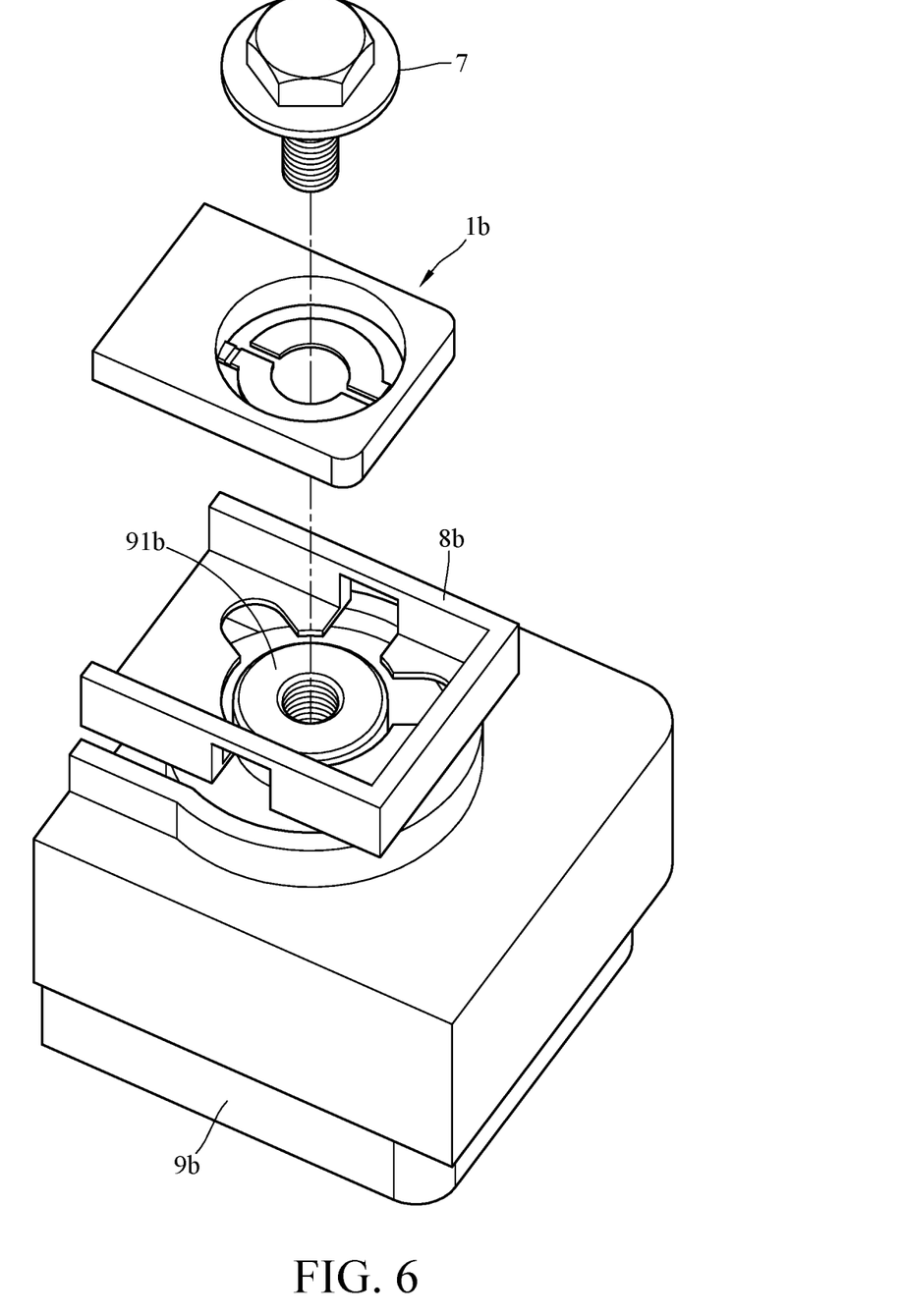
FIG. 6 is an exploded view of FIG. 5.

However, the present disclosure is not limited to the aforementioned battery busbar. For example, please refer to FIGS. 5-6, FIG. 5 is a partial enlarged perspective view of a battery busbar according to another embodiment of the present disclosure being disposed on a battery, FIG. 6 is an exploded view of FIG. 5, and FIG. 7 is a partial planar view of the battery busbar in FIG. 5.

This embodiment provides a battery busbar 1b. The battery busbar 1b is disposed on a battery 9b via a cover 8b. In this embodiment, the battery busbar 1b is made of copper, and the battery busbar 1b is fixed on a terminal 91b of the battery 9b via a screw 7. The said battery 9b is, for example, a battery for car.

Figure 7:
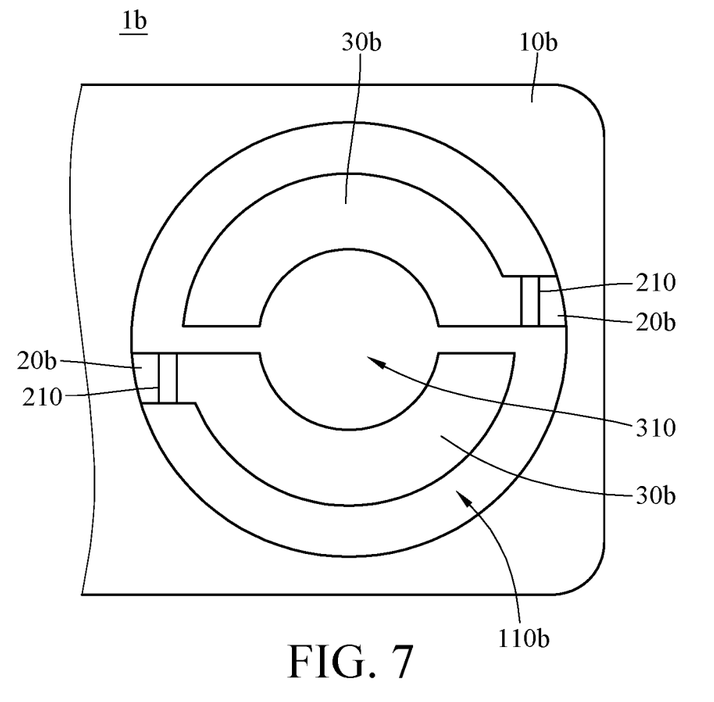
FIG. 7 is a partial planar view of the battery busbar in FIG. 5.

As shown in FIG. 7, the battery busbar 1b is made of one piece, and includes a conductive sheet 10b, two bridge portions 20b and two terminal contact portions 30b. The conductive sheet 10b has a cavity portion 110b. Each terminal contact portion 30b is in "C" shape. The two terminal contact portions 30b are respectively connected to different sides of the cavity portion 110b via the two bridge portions 20b. For example, the two bridge portions 20b are respectively connected to two opposite sides of the cavity portion 110b. The terminal contact portions 30b together form a fix hole 310 for the insertion of the screw 7, and the screw 7 can be screwed into the terminal 91b.

When an external force is applied on the whole system to cause it to vibrate, the battery 9b and the conductive sheet 10b may have a relative displacement. Similarly, at this moment, the bridge portions 20b can also act as a vibration buffer to absorb the vibration between the conductive sheet 10*b* and the terminal 91*b* in order to prevent the connection between the terminal contact portions 30*b* and the terminal 91*b* from breaking.

In addition, the bridge portions 20*b* are made in a specific size, so it also can be taken as a fuse in cases of short-circuit accidents or others.

Additionally, in this embodiment, each bridge portion 20*b* has a pre-made notch 210. The pre-made notch 210 helps to increase the resistance of the bridge portion 20*b* to ensure the function of the fuse. Moreover, when the external force is too large, the bridge portion 20*b* tends to break from the pre-made notch 210. The advantage of setting the pre-made notch 210 is preventing the stress from being concentrated on the terminal 91*b* by breaking the bridge portion 20*b* from the pre-made notch 210 when the external force is too large and has a large relative displacement between the battery 9*b* and the conductive sheet 10*b*.

Figure 8:
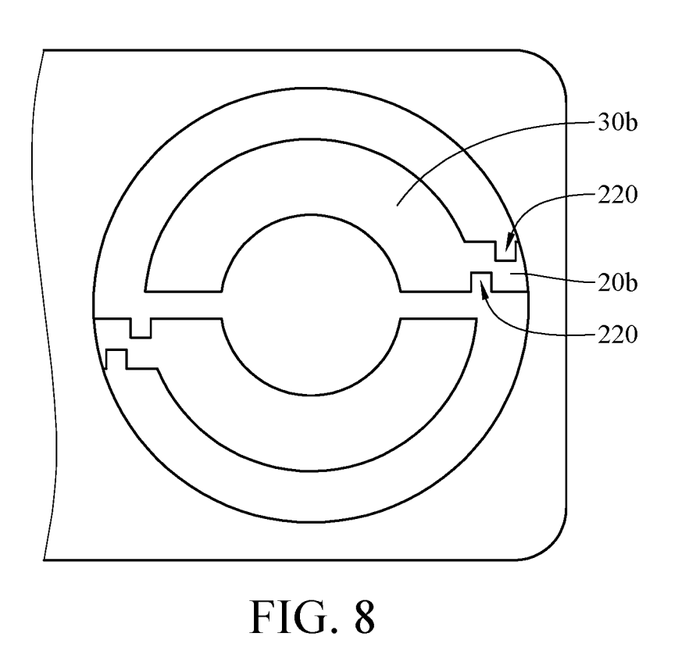
FIG. 8 is another example of the battery busbar in FIG. 5.

However, the present disclosure is not limited to the aforementioned pre-made notch. For example, please refer to FIG. 8, FIG. 8 is another example of the battery busbar in FIG. 5. As shown in FIG. 8, each bridge portion 20*b* has more than one pre-made cut-off 220 which are staggered so that the roots of the bridge portion 20*b* are jagged. Similarly, the pre-made cut-offs 220 can achieve the same effect as the aforementioned pre-made notch 210.

Figure 9:
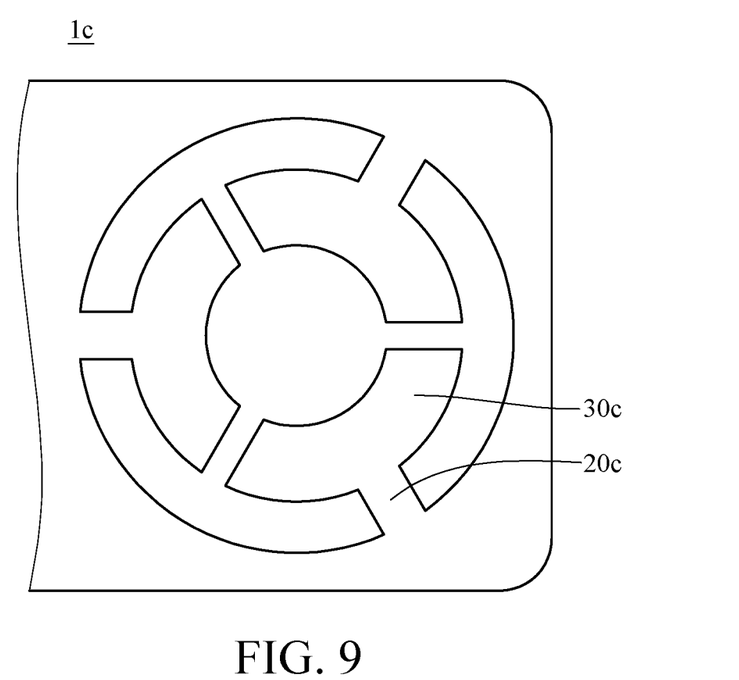
FIG. 9 is still another example of the battery busbar in FIG. 5.
Figure 10:
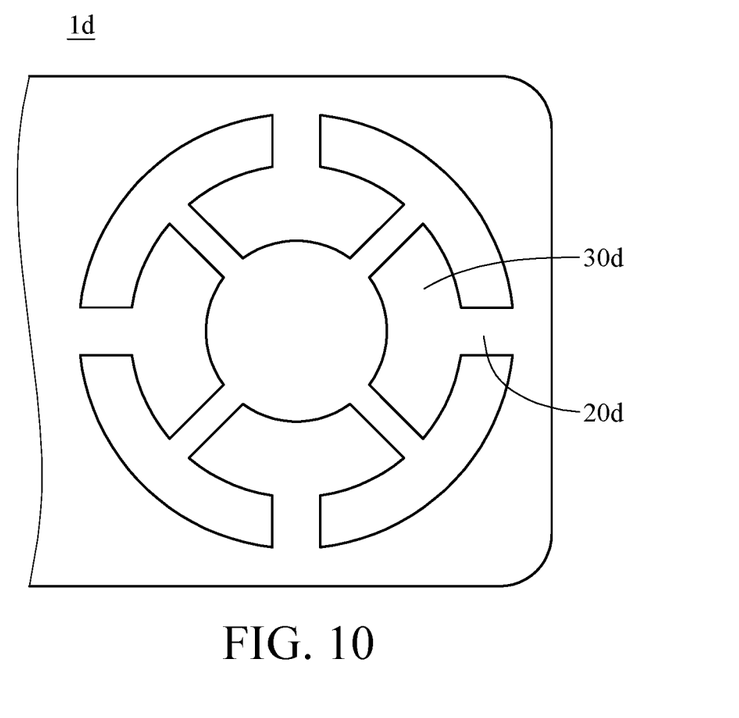
FIG. 10 is yet still another example of the battery busbar in FIG. 5.

Furthermore, the present disclosure is not limited to the quantities and the shapes of the bridge portions and the terminal contact portions. In other words, the present disclosure is not limited to the quantity of the electric current path. The quantity of the cavity portions may be more than two, and in each cavity portion, the quantities of the terminal contact portions and the bridge portions may be more than two. Specifically, please refer to FIG. 9, FIG. 9 provides a battery busbar 1*c* including three bridge portions 20*c* and three terminal contact portions 30*c* at each cavity portion. In the case of FIG. 9, the quantity of the electric current paths is increased to three. Then, please refer to FIG. 10, FIG. 10 provides a battery busbar 1*d* including four bridge portions 20*d* and four terminal contact portions 30*d*. In the case of FIG. 10, the quantity of the electric current paths is up to four. Of course, the quantities of the bridge portions and the terminal contact portions can be adjusted according to actual requirements. Also, it is understood that the battery busbars as shown in FIGS. 5 and 7-10 are interchangeable.

Figure 11:
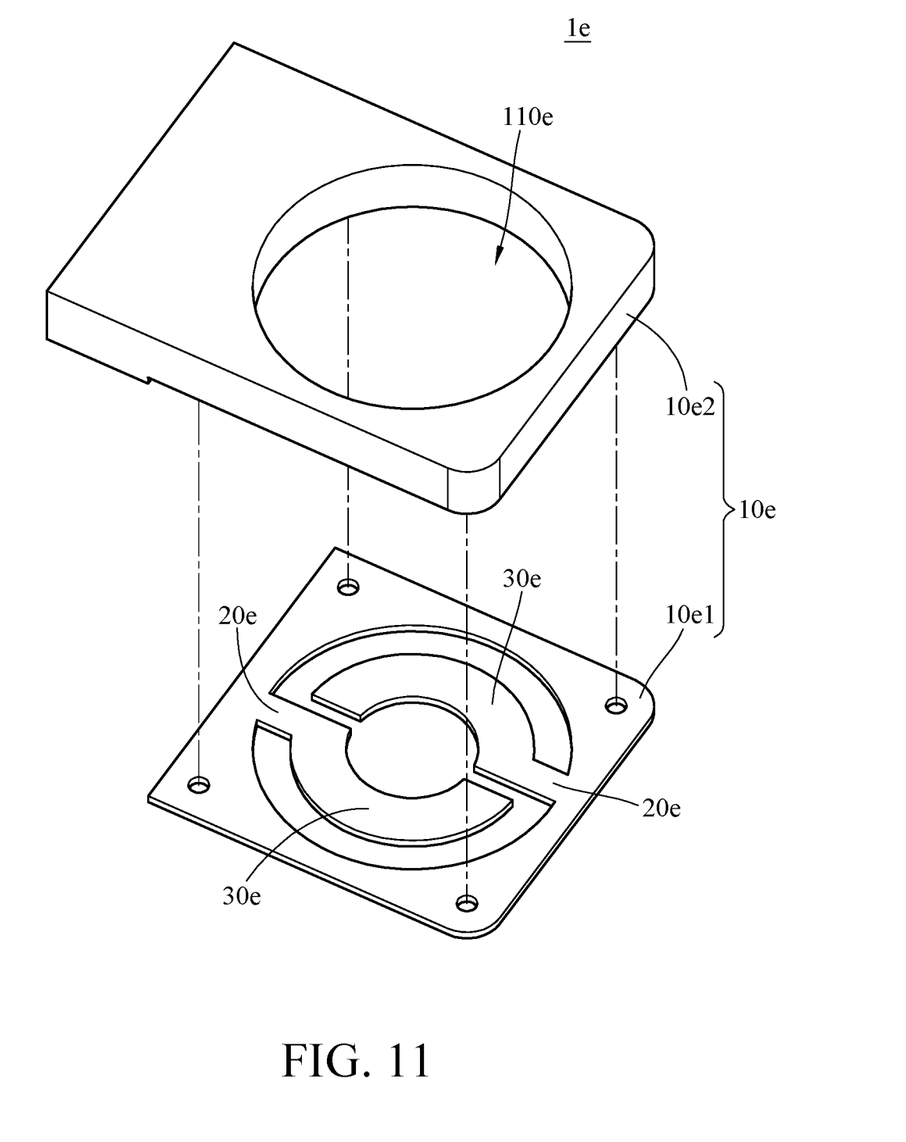
FIG. 11 is a partial enlarged perspective view of a battery busbar according to still another embodiment of the present disclosure.

Moreover, the battery busbar may not be made of one piece. For example, please refer to FIG. 11, FIG. 11 is a partial enlarged perspective view of a battery busbar according to still another embodiment of the present disclosure. This embodiment provides a battery busbar 1*e*. The battery busbar 1*e* includes a conductive sheet 10*e*, two bridge portions 20*e* and two terminal contact portions 30*e*. The battery busbar 1*b* in FIG. 5 and the battery busbar 1*e* in this embodiment are interchangeable. It is noted that the battery busbar 1*e* is not made of one piece. In detail, the conductive sheet 10*e* includes a first part 10*e*1 and a second part 10*e*2 which are independent from each other. The first part 10*e*1 is fixed at a side of the second part 10*e*2 by, for example, screwing. There is a cavity portion 110*e* penetrating through the first part 10*e*1 and the second part 10*e*2. The first part 10*e*1, the bridge portions 20*e* and the terminal contact portions 30*e* are made of one piece, and their material is, for example, nickel. The second part 10*e*2 is made of, for example, copper. In this embodiment, the bridge portions 20*e* can also achieve the same effect as the bridge portions in the aforementioned embodiments, e.g., fuse and vibration buffer.

Surely, the bridge portions 20*e* of this embodiment may additionally have the pre-made notches 210 as shown in FIG. 7 or the pre-made cut-offs 220 as shown in FIG. 8 according to actual requirements. Also, the quantities of the bridge portions 20*e* and the terminal contact portions 30*e* may be adjusted as that shown in FIG. 9 or 10.

According to the battery busbar as discussed in above, the bridge portions which are connected between the terminal contact portions and the conductive sheet can act as a vibration buffer to absorb vibration caused by an external force, thereby ensuring the electrical connection between the battery busbar and the battery terminals and increasing the reliability of the battery busbar.

In addition, the terminal contact portions with the oppositely disposed bridge portions help the electric current to flow through the soldering points and the battery terminal, ensuring the soldering quality and reducing the number of times when the soldering process is performed.

Furthermore, the bridge portion, which is made in a specific size, can be taken as a fuse in cases of short-circuit accidents or others, thereby expanding the range of application and increasing the safety.

Moreover, the battery busbar is made from cutting and then bending a metal sheet, thus the manufacturing cost is low and the product has a wide application potential. For example, the battery busbar can be soldered on the battery terminal (e.g., the battery busbar as shown in FIG. 2) or can be screwed on the battery terminal (e.g., the battery busbar as shown in FIGS. 5-11). In the former case, the shape formed by the terminal contact portions, which matches the shape of the battery terminal, helps the terminal contact portions to be aligned with the battery terminal so as to increase the manufacturing efficiency. In the latter case, the mounting of the battery busbar on the battery can be achieved simply by screwing, and the bridge portions have the pre-made notches to increase its resistance to ensure the function of the fuse and to prevent the stress from being concentrated on the battery terminal.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A battery busbar, comprising:
   a conductive sheet, having at least one circumferential inner edge and at least one cavity portion formed by the at least one circumferential inner edge;
   at least two bridge portions, each of the at least two bridge portions having a first end and a second end which are opposite to each other, and the first ends of the at least two bridge portions respectively directly connected to two opposite sides of the at least one circumferential inner edge forming the at least one cavity portion; and
   at least two terminal contact portions, spaced apart from each other, circumferentially surrounded by the circumferential inner edge, wherein the at least two terminal contact portions are respectively directly connected to the second ends of the at least two bridge portions via different sides thereof, the at least two terminal contact portions respectively extend in opposite extending directions identical to directions of the two bridge portions, so that the at least two bridge portions are respectively and electrically connected to the two opposite sides of the at least one circumferential inner edge, the at least two terminal contact portions are non-coplanar with the conductive sheet via the at least two bridge portions, a width direction is defined to be substantially perpendicular to a line passing through the first end and the second end of one of the at least two bridge portions; along the width direction, a width of the bridge portion is smaller than a width of the terminal contact portion.

2. The battery busbar according to claim 1, wherein the at least two bridge portions are respectively directly connected to two opposite sides of the at least one circumferential inner edge forming the at least one cavity portion.

3. The battery busbar according to claim 1, wherein the at least two bridge portions are bendable with respect to the conductive sheet, such that the at least two terminal contact portions are able to be bent to be non-coplanar with the conductive sheet.

4. The battery busbar according to claim 1, wherein the conductive sheet, the at least two terminal contact portions and the at least two bridge portions are made of one piece.

5. The battery busbar according to claim 1, wherein each of the at least two bridge portions has a pre-made notch on at least one edge thereof.

6. The battery busbar according to claim 1, wherein each of the at least two bridge portions has at least one pre-made cut-off on at least one edge thereof.

7. The battery busbar according to claim 1, wherein the conductive sheet is independent from the at least two terminal contact potions and the at least two bridge portions.

8. The battery busbar according to claim 7, wherein the conductive sheet includes a first part and a second part which are independent from each other, the first part is fixed at a side of the second part, the at least one cavity portion penetrates through the first part and the second part, and the first part, the at least two terminal contact portions and the at least two bridge portions are made of one piece.

9. The battery busbar according to claim 1, wherein a shape, formed by the at least two terminal contact portions, matches a shape of a terminal of a battery.

10. The battery busbar according to claim 1, wherein each of the at least two terminal contact portions is in a semicircle shape, and each of the at least two bridge portions is in an elongated shape.

11. The battery busbar according to claim 1, wherein each of the at least two terminal contact portions is in a C shape, and each of the at least two bridge portions is in an elongated shape.

12. The battery busbar according to claim 1, wherein the at least two terminal contact portions get together and form a fix hole.

13. The battery busbar according to claim 1, wherein the quantity of the at least one cavity portion is plural.

14. The battery busbar according to claim 1, wherein the at least two terminal contact portions and the at least two bridge portions are the same in quantity.

* * * * *